US012643515B2

(12) United States Patent
Dijken et al.

(10) Patent No.: US 12,643,515 B2
(45) Date of Patent: Jun. 2, 2026

(54) BRAKE APPARATUS FOR A WHEEL OF A VEHICLE

(71) Applicant: Lightyear IPCo B.V., Helmond (NL)

(72) Inventors: Durandus Kornelius Dijken, Eindhoven (NL); Jaap Van De Vorst, Nijmegen (NL)

(73) Assignee: Lightyear IPCo B.V., Helmond (NL)

( * ) Notice: Subject to any disclaimer, the term of this patent is extended or adjusted under 35 U.S.C. 154(b) by 21 days.

(21) Appl. No.: 18/712,089

(22) PCT Filed: Nov. 30, 2022

(86) PCT No.: PCT/EP2022/083761
§ 371 (c)(1),
(2) Date: May 21, 2024

(87) PCT Pub. No.: WO2023/099517
PCT Pub. Date: Jun. 8, 2023

(65) Prior Publication Data
US 2025/0018911 A1     Jan. 16, 2025

(30) Foreign Application Priority Data
Nov. 30, 2021   (NL) ..................................... 2029964

(51) Int. Cl.
  *B60T 8/58*      (2006.01)
  *B60T 1/06*      (2006.01)
  (Continued)

(52) U.S. Cl.
  CPC ................ *B60T 8/58* (2013.01); *B60T 1/065* (2013.01); *B60T 7/042* (2013.01); *B60T 8/171* (2013.01);
  (Continued)

(58) Field of Classification Search
  CPC ........ B60T 1/065; B60T 13/66; B60T 13/662; B60T 8/171; B60T 8/172; B60T 8/58;
  (Continued)

(56) References Cited

U.S. PATENT DOCUMENTS 4,629,043 A   12/1986  Matsuo et al.
4,933,858 A *  6/1990  Matsuda ............. B60T 8/17616
                            303/154
(Continued)

FOREIGN PATENT DOCUMENTS

CN       112677994 A    4/2021

OTHER PUBLICATIONS

PCT International Search Report and Written Opinion dated Feb. 16, 2023, for International Application No. PCT/EP2022/083761.
(Continued)

*Primary Examiner* — Hai H Huynh
*Assistant Examiner* — Johnny H Hoang
(74) *Attorney, Agent, or Firm* — Patterson + Sheridan, LLP

(57) ABSTRACT

A brake apparatus for a wheel of a vehicle, comprising a brake pad to generate a brake force when the brake pad engages a brake disc, the brake disc being associated with the wheel of the vehicle a brake actuator, which is adapted to move the brake pad towards the brake disc, and bring the brake pad into contact with the brake disc, therewith generating a requested brake force in response to a brake action request, a control unit configured to determine whether a brake action request is present, determine whether the vehicle is standing still, instruct the brake actuator to reduce the brake force with which the brake pad engages the brake disc when the control unit has determined that the brake action request is present and the control unit has determined that the vehicle is standing still.

22 Claims, 8 Drawing Sheets

(51) Int. Cl.

| | |
|---|---|
| *B60T 7/04* | (2006.01) |
| *B60T 8/17* | (2006.01) |
| *B60T 8/171* | (2006.01) |
| *B60T 8/172* | (2006.01) |
| *B60T 13/58* | (2006.01) |

(52) U.S. Cl.
CPC ............ *B60T 8/172* (2013.01); *B60T 13/588* (2013.01); *B60T 2201/06* (2013.01); *B60T 2210/20* (2013.01); *B60T 2210/32* (2013.01); *B60T 2220/04* (2013.01); *B60T 2250/04* (2013.01); *B60T 2270/82* (2013.01)

(58) Field of Classification Search
CPC ............ B60T 2210/32; B60T 2210/20; B60T 2201/06; B60T 2250/04; B60T 2270/82; B60T 2220/04
See application file for complete search history.

(56) References Cited

U.S. PATENT DOCUMENTS

| | | | |
|---|---|---|---|
| 5,390,992 A | | 2/1995 | Walenty et al. |
| 6,346,064 B1* | | 2/2002 | Hada ..................... B60W 10/18 |
| | | | 477/901 |
| 10,589,738 B1 | | 3/2020 | Boecker et al. |
| 2006/0015239 A1* | | 1/2006 | Higuchi ................ B60T 8/1755 |
| | | | 701/72 |
| 2010/0222978 A1* | | 9/2010 | Kodama ............... B60T 8/4872 |
| | | | 701/70 |
| 2011/0190998 A1* | | 8/2011 | Kato ......................... B60T 7/22 |
| | | | 701/70 |
| 2011/0251770 A1* | | 10/2011 | Minarcin ............. B60W 10/08 |
| | | | 701/70 |
| 2013/0192937 A1* | | 8/2013 | Furuyama ............... B60T 7/122 |
| | | | 188/106 F |
| 2015/0175137 A1* | | 6/2015 | Murata ................... B60T 7/042 |
| | | | 701/70 |
| 2016/0121726 A1* | | 5/2016 | Tamai ...................... B60L 7/26 |
| | | | 701/22 |
| 2018/0194353 A1 | | 7/2018 | Kilmurray et al. |
| 2020/0223404 A1* | | 7/2020 | Asano ...................... B60T 7/12 |
| 2020/0223440 A1* | | 7/2020 | Takahashi ............. B60Q 1/343 |
| 2021/0213942 A1 | | 7/2021 | Kayano |
| 2021/0213974 A1* | | 7/2021 | Shimbo .................. G08G 1/165 |
| 2023/0150371 A1* | | 5/2023 | Hingst ................... B60T 8/172 |
| | | | 701/22 |
| 2023/0174036 A1* | | 6/2023 | Saotome ............. B60T 8/17616 |
| | | | 701/78 |

OTHER PUBLICATIONS

Netherlands Search Report and Written Opinion dated Jan. 22, 2022, for Netherlands Application No. 2029964.

* cited by examiner

BRAKE APPARATUS FOR A WHEEL OF A VEHICLE

The invention pertains to a brake apparatus for a wheel of a vehicle, a vehicle comprising such a brake apparatus, a method for adjusting the brake force exerted by a brake apparatus of a vehicle and a computer program for adjusting the brake force exerted by a brake apparatus of a vehicle.

A common type of brake apparatus for wheels of a vehicle comprises a brake disc which rotates along with the wheel, and a brake pad which is forced against the brake disc during a brake action. The forcing of the brake pad against the brake disc cause friction between the brake pad and the brake disc, and therewith slows down the wheel with which the brake disc is associated.

After the brake action, the brake pad is withdrawn from the brake disc. However, if the brake pad is not withdrawn over a sufficient distance from the brake disc for example due to wear or the presence of contaminants like dirt or rust, some contact will remain present between the brake pad and the brake disc during normal driving, i.e. driving when no brake action is demanded by a driver or by an automated system of the vehicle. This undesired contact during normal driving is in the art referred to as "brake drag". Brake drag has a negative effect on the energy efficiency of the vehicle.

Many solutions to reducing, alleviating or eliminating brake drag have been proposed in the art. For example, mechanical elements such as springs have been proposed to provide a return force on the brake pad once the brake action is no longer required. However, such elements often exert a continuous force, which must be overcome to bring the brake pad into engagement with the brake disc. This makes that a larger force has to be applied in order to effect a brake action, which also may have an impact on the "pedal feel" that a driver experiences when pushing down the brake pedal to effect a brake action.

The invention aims to provide a brake apparatus and method for controlling the brake force which reduces the risk of brake drag.

This object of the invention is achieved by a brake apparatus for a wheel of a vehicle, comprising:
- a brake pad arranged to interact with a brake disc to generate a brake force when the brake pad engages the brake disc, the brake disc being associated with the wheel of the vehicle;
- a brake actuator, which is adapted to move the brake pad towards the brake disc, and bring the brake pad into contact with the brake disc, therewith generating a requested brake force in response to a brake action request;
- a control unit configured to:
  - determine whether a brake action request is present;
  - determine whether the vehicle is standing still;
  - instruct the brake actuator to reduce the brake force with which the brake pad engages the brake disc when the control unit has determined that the brake action request is present and the control unit has determined that the vehicle is standing still.

The brake apparatus according to the invention comprises a brake pad that is arranged to interact with a brake disc to generate a brake force when the brake pad engages the brake disc. The brake disc being associated with the wheel of the vehicle and rotates along with this wheel. The brake disc can for example be a dedicated brake disc which has the main purpose of braking or a rotor of an in-wheel motor.

The brake apparatus further comprises a brake actuator, which is adapted to move the brake pad towards the brake disc and to bring the brake pad into contact with the brake disc. Therewith a requested brake force is generated.

The requested brake force is generated in response to a brake action request. A brake action request can for example be triggered by a driver engaging a brake pedal or by an automated vehicle system, e.g. an automated vehicle safety system or an autonomous driving system, which triggers a brake action request for example in order to avoid a collision.

The brake apparatus according to the invention further comprises a control unit. The control unit is configured to:
- determine whether a brake action request is present;
- determine whether the vehicle is standing still;
- instruct the brake actuator to reduce the brake force with which the brake pad engages the brake disc when the control unit has determined that the brake action request is present and the control unit has determined that the vehicle is standing still.

The vehicle is standing still if it does not move over a ground surface in a travelling direction as a result of rotation of a wheel of the vehicle and/or sliding of a wheel of the vehicle over the ground surface.

So, when a brake action request is still present while the vehicle has already come to a standstill, e.g. when the driver keeps on pressing the brake pedal while the vehicle is standing still in front of a red traffic light, the control system instructs the brake actuator to reduce the brake force with which the brake pad engages the brake disc. So, the brake force is reduced when the full brake force is no longer necessary because the vehicle is already standing still.

By doing so, the brake force that has to be overcome to move away the brake pad from the brake disc when the brake action request is removed is also reduced. This makes it easier to move away the brake pad from the brake disc once the vehicle is to be put in motion again, and therewith reduces the risk that brake drag occurs.

The brake apparatus according to the invention differs from the situation in which a driver removes his foot from the brake pedal after bringing the vehicle to a full stop, e.g. in front of a red traffic light, because when the driver removes his foot from the brake pedal, the brake action request is no longer present. The brake apparatus according to the invention differs from an ABS (anti brake lock system) because an ABS reduces or removes the brake force while the vehicle is still moving.

Optionally, in the brake apparatus according to the invention, the brake actuator is or comprises a piston which is connected either directly or indirectly to the brake pad for moving the brake pad towards the brake disc and pressing the brake pad against the brake disc at a brake force. The brake force generates friction between the brake pad and the brake disc, which friction slows down the wheel of the vehicle with which the brake disc is associated with. Usually, the brake disc is connected to the wheel to which said brake disc is associated with.

The piston of the brake actuator is for example operated hydraulically, electrically or pneumatically.

In an embodiment, the brake actuator is mechanically connected or mechanically connectable to a brake pedal. Optionally, the brake pedal is part of the brake apparatus.

In an embodiment, the brake actuator is activated by a control signal, e.g. an electric or electronic control signal. The control signal is for example triggered when a brake pedal is pushed down by a driver or by an automated vehicle system such as an autonomous driving system or an automated vehicle safety system such as a collision prevention system.

In an embodiment, the brake actuator is not only adapted to move the brake pad towards the brake disc and to press the brake pad against the brake disc, but also to move the brake pad away from the brake disc when the brake is released, i.e. the brake action request is removed. The brake action request is for example removed when a driver releases the brake pedal or when the automated vehicle system that triggered the brake action request no longer maintains the brake action request.

In an embodiment, the control unit is adapted to receive a brake action signal which indicates that a brake action request is present. This brake action signal and/or input for the brake action signal can for example be provided by a force sensor, a pressure sensor, a position sensor, a displacement sensor and/or by an automated vehicle system. Optionally, the force sensor determines the force that is exerted on a brake pedal. Optionally, the pressure sensor determines the pressure that is exerted on a brake pedal. Optionally, the position sensor determines the position of a brake pedal. Optionally, the displacement sensor determines the displacement of a brake pedal. The force sensor, pressure sensor, position sensor and/or displacement sensor is for example a sensor which is used also by at least one other system in the vehicle. Alternatively, the velocity sensor is a dedicated sensor that forms part of the brake apparatus.

Optionally, the control unit comprises a brake action signal input port which is adapted to receive the brake action signal.

In an embodiment, the control unit is adapted to receive a vehicle velocity signal which is indicative of the velocity of the vehicle. The control unit is adapted to derive from the vehicle velocity signal whether the vehicle is standing still or not. This vehicle velocity signal and/or input for the vehicle velocity signal can for example be provided by a velocity sensor which determines the overall velocity of the vehicle or a rotational velocity sensor which determines the rotational velocity and/or angular velocity of a wheel of the vehicle. Alternatively or in addition, the vehicle velocity signal and/or input for the vehicle velocity signal can be provided by an automated vehicle system. Optionally, the velocity sensor is for example a sensor which is used also by at least one other system in the vehicle. Alternatively, the velocity sensor is for example a dedicated sensor that forms part of the brake apparatus.

Optionally, the control unit comprises a vehicle velocity signal input port which is adapted to receive the vehicle velocity signal.

In an embodiment, the control unit comprises a microprocessor, a brake action signal input port, a vehicle velocity signal input port and a brake force signal output port.

The brake action signal input port is adapted to receive a brake action signal, which brake action signal indicates that a brake action request is present. The vehicle velocity signal input port is adapted to receive a vehicle velocity signal, which vehicle velocity signal is indicative of the velocity of the vehicle.

The microprocessor of the control unit is adapted to process the brake action signal and the vehicle velocity signal in order to determine whether a brake action request is present or not and whether the vehicle is standing still or moving.

If the microprocessor of the control unit has determined that a brake action request is present and the vehicle is standing still (i.e. not moving over a ground surface in a travelling direction as a result of rotation of a wheel of the vehicle and/or sliding of a wheel of the vehicle over the ground surface), then the control unit generates a brake force signal. The brake force signal is sent to the brake actuator via the brake force signal output port of the control unit. The brake force signal instructs the brake actuator to reduce the brake force with which the brake pad engages the brake disc.

Optionally, the brake force signal output port is connected to the brake actuator via a wired or wireless connection.

Optionally, the brake actuator comprises a piston which is connected to the brake pad, an electric motor which is adapted to drive the brake pad via the piston, and a brake actuator controller which is adapted to control the electric motor of the brake actuator so that the electric motor imposes the desired movement and/or braking force on the brake pad. In this case, the brake force signal from the control unit is received by the brake actuator controller, and via this brake force signal the electric motor is instructed to reduce the brake force with which the brake pad engages the brake disc. Optionally, the control unit and the brake actuator controller are integrated into a single control system. Optionally, the control unit and the brake actuator controller are separate entities.

Optionally, the brake actuator comprises a hydraulic piston which is connected to the brake pad, a hydraulic drive system which is adapted to drive the brake pad via the piston, and a brake actuator controller which is adapted to control the hydraulic drive system of the brake actuator so that the hydraulic drive system imposes the desired movement and/or braking force on the brake pad. In this case, the brake force signal from the control unit is received by the brake actuator controller, and via this brake force signal the hydraulic drive system is instructed to reduce the brake force with which the brake pad engages the brake disc. Optionally, the control unit and the brake actuator controller are integrated into a single control system. Optionally, the control unit and the brake actuator controller are separate entities.

In an embodiment, the control unit is configured to instruct the brake actuator to eliminate the brake force.

In this embodiment, the brake actuator is instructed to reduce the brake force to zero when the control unit has determined that (i.e. established that) a brake action request is present and the vehicle is standing still.

Optionally, the brake actuator is instructed to disengage the brake pad from the brake disc. The brake actuator for example actively moves the brake pad away from the brake disc, e.g. by exerting a force on a piston to which the brake pad is connected. Or, optionally, in case a bias force is present which biases the brake pad away from the brake disc and a brake force overcomes the bias force when a brake action is required, the brake force is eliminated or removed and the bias force biases the brake pad away from the brake disc.

In an embodiment, the brake apparatus further comprises a brake pedal and a brake pedal pressure sensor. The brake pedal is adapted to be used by the driver of the vehicle to generate a brake action request. The brake pedal pressure sensor is adapted to measure pedal pressure that is exerted on the brake pedal by a driver, and the brake actuator is adapted to generate a requested brake force that has a predetermined relation with the measured pedal pressure. For example, the requested brake force is proportional to the measured pedal pressure.

Optionally, the brake pedal pressure sensor is adapted to generate a brake action signal and/or input for a brake action signal which indicates that a brake action request is present.

In an embodiment, the brake apparatus according to the invention further comprises a velocity sensor which is configured to measure the velocity of the vehicle. Furthermore, the control unit is configured to determine whether the vehicle is standing still based on a measurement of the velocity sensor.

Optionally, the control unit is configured to determine that the vehicle is standing still if the result of the measurement of the velocity sensor is equal to 0 m/s. The control unit is furthermore is configured to determine that the vehicle is not standing still if the result of the measurement of the velocity sensor is not equal to 0 m/s.

In an embodiment, the brake apparatus according to the invention further comprises an electronic parking brake. The electronic parking brake is configured to bring a brake pad in contact with the brake disc if the vehicle is standing still, therewith generating a brake force to keep the vehicle standing still. In this embodiment, the control unit is further configured to, after instructing the brake actuator to reduce the brake force with which the brake pad engages the brake disc, instruct the electronic parking brake to bring the brake pad in contact with the brake disc.

The brake pad which can be brought into contact with the brake disc can be a brake pad of the brake apparatus or a dedicated parking brake pad.

Optionally, the electronic parking brake comprises a parking brake actuator, which is separate from the brake actuator of the brake apparatus. The parking brake actuator is preferably an electric or electronic actuator, comprising for example an electric or electronic motor in combination with a spindle and/or piston, or a linear actuator. Contrary to a brake actuator that cooperates with a brake pedal, the parking brake actuator does not have to be designed for the right "pedal feel", i.e. the feedback that the brake pedal gives to the driver. This makes that the design of the parking brake actuator can be optimised to minimise the risk of brake drag after disengagement of the parking brake. For example, when the electronic parking brake is disengaged, the brake pad can be retracted more rigorously than if the brake apparatus itself would do. Therefore, the risk of brake drag is reduced in this embodiment even though a brake force is present when the vehicle is standing still. The use of the electronic parking brake allows to retract the brake pad in such a way that the risk of brake drag is minimised.

Optionally, the electronic parking brake comprises a parking brake controller, which is adapted to receive a parking brake activation signal from the control unit of the brake apparatus to activate the electronic parking brake configured to bring the brake pad in contact with the brake disc.

In an embodiment, the control unit of the brake apparatus according to the invention is configured to monitor the velocity of the vehicle after the control unit has instructed the brake actuator to reduce the brake force with which the brake pad engages the brake disc. In this embodiment, the control unit is configured to instruct the brake actuator to restore the brake force to the requested brake force when the control unit has determined that the vehicle is not standing still.

This embodiment adds a safety feature to the brake apparatus according to the invention. It is possible that after the vehicle has come to a standstill (e.g. in front of a traffic light), the vehicle starts to move again when the brake force has been reduced, for example because the vehicle is standing on a sloped surface. When the monitoring of the velocity of the vehicle after reduction of the brake force shows that the vehicle is no longer standing still, i.e. is moving, the brake force is restored so the vehicle is again brought to a standstill.

Optionally, in this embodiment, the control unit of the brake apparatus further is configured to detect whether a drive system for driving the vehicle (comprising e.g. a central electric motor, a plurality of electric in-wheel motors and/or an internal combustion engine) is active. If the control unit detects that the drive system is not active, the control unit is configured to instruct the brake actuator to restore the brake force to the requested brake force but if the control unit detects that the drive system is active, the control unit is configured to not instruct the brake actuator to restore the brake force. This way, it is ensured that only unintentional movement of the vehicle is suppressed by the restoration of the brake force.

Optionally, in a variant of this embodiment, the brake apparatus according to the invention further comprises an electronic parking brake. The electronic parking brake is configured to bring a brake pad in contact with the brake disc if the vehicle is standing still, therewith generating a brake force to keep the vehicle standing still. In this variant, the control unit is further configured to, after instructing the brake actuator to reduce the brake force with which the brake pad engages the brake disc, and after it has been determined by the control unit that the vehicle is no longer standing still, instruct the electronic parking brake to bring the brake pad in contact with the brake disc.

In this variant, the brake pad which can be brought into contact with the brake disc can be a brake pad of the brake apparatus or a dedicated parking brake pad.

Optionally, in this variant, the electronic parking brake comprises a parking brake actuator, which is separate from the brake actuator of the brake apparatus. The parking brake actuator is preferably an electric or electronic actuator, comprising for example an electric or electronic motor in combination with a spindle and/or piston, or a linear actuator. Contrary to a brake actuator that cooperates with a brake pedal, the parking brake actuator does not have to be designed for the right "pedal feel", i.e. the feedback that the brake pedal gives to the driver. This makes that the design of the parking brake actuator can be optimised to minimise the risk of brake drag after disengagement of the parking brake. For example, when the electronic parking brake is disengaged, the brake pad can be retracted more rigorously than if the brake apparatus itself would do. Therefore, the risk of brake drag is reduced in this embodiment even though a brake force is present when the vehicle is standing still. The use of the electronic parking brake allows to retract the brake pad in such a way that the risk of brake drag is minimised.

Optionally, in this variant, the electronic parking brake comprises a parking brake controller, which is adapted to receive a parking brake activation signal from the control unit of the brake apparatus to activate the electronic parking brake configured to bring the brake pad in contact with the brake disc.

In an embodiment, the control unit of the brake apparatus according to the invention is further configured to:

determine whether the vehicle is located on a sloped surface; and after instructing the brake actuator to reduce the brake force with which the brake pad engages the brake disc, instruct the brake actuator to restore the brake force to the requested brake force when the control unit has determined that the vehicle is located on a sloped surface.

This embodiment adds a safety feature to the brake apparatus according to the invention. In case the vehicle is on a sloped surface, there is a risk that the vehicle may start moving unintentionally when the brake force has been reduced.

Optionally, in this embodiment, the brake apparatus further comprises an inclination sensor configured to measure the inclination of the vehicle with respect to horizontal, wherein the control unit is configured to determine whether the vehicle is located on a sloped surface based on a measurement of the inclination sensor. Optionally, the control unit is configured to determine that the vehicle is located on a sloped surface if the measurement of the inclination sensor is not substantially equal to 0°, and is configured to determine that the vehicle is not located on a sloped surface if the measurement of the inclination sensor is substantially equal to 0°.

In a variant of this embodiment, the control unit of the brake apparatus according to the invention is further configured to:

determine whether the vehicle is located on a sloped surface; and prevent instruction of the brake actuator to reduce the brake force with which the brake pad engages the brake disc.

Optionally, in a further variant of this embodiment, the brake apparatus according to the invention further comprises an electronic parking brake. The electronic parking brake is configured to bring a brake pad in contact with the brake disc if the vehicle is standing still, therewith generating a brake force to keep the vehicle standing still. In this variant, the control unit is further configured to, after instructing the brake actuator to reduce the brake force with which the brake pad engages the brake disc, and after it has been determined by the control unit that the vehicle is arranged on a sloped surface, instruct the electronic parking brake to bring the brake pad in contact with the brake disc.

In this variant, the brake pad which can be brought into contact with the brake disc can be a brake pad of the brake apparatus or a dedicated parking brake pad.

Optionally, in this variant, the electronic parking brake comprises a parking brake actuator, which is separate from the brake actuator of the brake apparatus. The parking brake actuator is preferably an electric or electronic actuator, comprising for example an electric or electronic motor in combination with a spindle and/or piston, or a linear actuator. Contrary to a brake actuator that cooperates with a brake pedal, the parking brake actuator does not have to be designed for the right "pedal feel", i.e. the feedback that the brake pedal gives to the driver. This makes that the design of the parking brake actuator can be optimised to minimise the risk of brake drag after disengagement of the parking brake. For example, when the electronic parking brake is disengaged, the brake pad can be retracted more rigorously than if the brake apparatus itself would do. Therefore, the risk of brake drag is reduced in this embodiment even though a brake force is present when the vehicle is standing still. The use of the electronic parking brake allows to retract the brake pad in such a way that the risk of brake drag is minimised.

Optionally, in this variant, the electronic parking brake comprises a parking brake controller, which is adapted to receive a parking brake activation signal from the control unit of the brake apparatus to activate the electronic parking brake configured to bring the brake pad in contact with the brake disc.

In an embodiment, the control unit of the brake apparatus according to the invention is further configured to:

determine whether an object is approaching the vehicle;

after instructing the brake actuator to reduce the brake force with which the brake pad engages the brake disc, instruct the brake actuator to restore the brake force to the requested brake force when the control unit has determined (i.e. detected) that an object is approaching the vehicle.

This embodiment adds a safety feature to the brake apparatus according to the invention. In case the vehicle is approached by an object which may move the vehicle out of the position in which it is standing still, the control unit instructs the brake actuator to restore the brake force to the requested brake force. This way, undesired movement of the vehicle is prevented. The object is for example another vehicle that is moving towards the vehicle with the brake apparatus.

Optionally, the control unit is configured to determine whether vehicle is located within a predicted trajectory of the object that is determined as approaching the vehicle, and to instruct the brake actuator to restore the brake force to the requested brake force only when the control unit has determined that the vehicle is located in a position within or adjacent to the predicted trajectory.

In a variant of this embodiment, the control unit of the brake apparatus according to the invention is further configured to:

determine whether an object is approaching the vehicle; and prevent instruction of the brake actuator to reduce the brake force with which the brake pad engages the brake disc.

Optionally, in this embodiment, the brake apparatus according to the invention further comprises a camera which is configured to capture a stream of pictures of an area around the vehicle. In addition, the control unit is further configured to:

analyse the stream of pictures of the area around the vehicle to obtain a picture stream analysis result, determine whether an object is approaching the vehicle based on the picture stream analysis result.

Optionally, the control unit is configured to determine a predicted trajectory of the object based on the picture stream analysis result.

Optionally, as an alternative for or in addition to the camera, in this embodiment of the brake apparatus according to the invention, further comprises a radar and/or a lidar, configured to detect a position and/or a velocity and/or an acceleration of objects in an area around the vehicle. The control unit is further configured to determine whether an object is approaching the vehicle based on the position and/or the velocity and/or the acceleration of objects in the area around the vehicle. Optionally, the control unit is configured to determine a predicted trajectory of a detected object based on input that is received by the control unit from the radar and/or lidar.

Optionally, in a variant of this embodiment, the brake apparatus according to the invention further comprises an electronic parking brake. The electronic parking brake is configured to bring a brake pad in contact with the brake disc if the vehicle is standing still, therewith generating a brake force to keep the vehicle standing still. In this variant, the control unit is further configured to, after instructing the brake actuator to reduce the brake force with which the brake pad engages the brake disc, and after it has been determined by the control unit that an object approached the vehicle, instruct the electronic parking brake to bring the brake pad in contact with the brake disc.

In this variant, the brake pad which can be brought into contact with the brake disc can be a brake pad of the brake apparatus or a dedicated parking brake pad.

Optionally, in this variant, the electronic parking brake comprises a parking brake actuator, which is separate from the brake actuator of the brake apparatus. The parking brake actuator is preferably an electric or electronic actuator, comprising for example an electric or electronic motor in combination with a spindle and/or piston, or a linear actuator. Contrary to a brake actuator that cooperates with a brake pedal, the parking brake actuator does not have to be designed for the right "pedal feel", i.e. the feedback that the brake pedal gives to the driver. This makes that the design of the parking brake actuator can be optimised to minimise the risk of brake drag after disengagement of the parking brake. For example, when the electronic parking brake is disengaged, the brake pad can be retracted more rigorously than if the brake apparatus itself would do. Therefore, the risk of brake drag is reduced in this embodiment even though a brake force is present when the vehicle is standing still. The use of the electronic parking brake allows to retract the brake pad in such a way that the risk of brake drag is minimised.

Optionally, in this variant, the electronic parking brake comprises a parking brake controller, which is adapted to receive a parking brake activation signal from the control unit of the brake apparatus to activate the electronic parking brake configured to bring the brake pad in contact with the brake disc.

In an embodiment, the brake apparatus according to the invention comprises:

a plurality of brake pads, each brake pad being arranged to interact with an associated brake disc to generate a brake force when the brake pad engages the associated brake disc, each brake disc being associated with a single wheel of the vehicle;

a plurality of brake actuators, each brake actuator being adapted to move a respective brake pad towards its associated brake disc, and bring the respective brake disc into contact with the associated brake disc, therewith generating a requested brake force in response to a brake action request;

wherein the control unit is configured to instruct the brake actuator to reduce the brake force with which at least two brake pads of the plurality of brake pads engage their respective brake disc when the control unit has determined that the brake action request is present and the control unit has determined that the vehicle is standing still.

In this embodiment, the benefits of the invention are extended to multiple wheels of the vehicle, optionally to all wheels of the vehicle. This way, energy loss caused by brake drag can be further reduced or even eliminated.

This embodiment may be combined with any one or more of the embodiments described above and below.

Optionally, in this embodiment, the control unit is configured to instruct all but one of the brake actuators to reduce or eliminate the respective brake force.

Optionally, in this embodiment, the control unit is configured to instruct the plurality of brake actuators to equally reduce the respective brake force.

The invention further pertains to a vehicle comprising:

at least one wheel;

a brake apparatus according to the invention;

wherein the brake apparatus comprises the same number of brake pads and the same number of brake actuators as the number of wheels of the vehicle.

Optionally, the brake apparatus comprises a larger number of brake pads and/or a larger number of brake actuators than the number of wheels of the vehicle.

Optionally, the brake apparatus is or comprises an embodiment of the brake apparatus according to the invention as described above or below.

Optionally, the brake apparatus is or comprises multiple embodiments of the brake apparatus according to the invention as described above or below.

The invention further pertains to a method for adjusting the brake force exerted by a brake apparatus of a vehicle, the method comprising the following steps:

obtaining a brake action status indicating whether a brake action request is present;

obtaining a standstill status indicating whether the vehicle is standing still;

when the brake action status indicates that a brake action request is present and the standstill status indicates that the vehicle is standing still, instructing a brake actuator of the brake apparatus to reduce a brake force with which a brake pad of the brake apparatus engages a brake disc of the vehicle.

In an embodiment, the method according to the invention further comprises the following step:

after instructing a brake actuator of the brake apparatus to reduce a brake force with which a brake pad of the brake apparatus engages a brake disc of the vehicle, instructing the brake actuator to restore the brake force to the requested brake force when the brake action status indicates that a brake action request is present and the standstill status indicates that the vehicle is not standing still.

In an embodiment, the method according to the invention further comprises the following step:

after instructing the brake actuator to reduce the brake force with which the brake pad engages the brake disc, instructing an electronic parking brake to bring the brake pad in contact with the brake disc if the vehicle is standing still, therewith generating a brake force to keep the vehicle standing still.

In an embodiment, the method according to the invention further comprises the following steps:

obtaining a slope status indicating whether the vehicle is located on a sloped surface;

after instructing a brake actuator of the brake apparatus to reduce a brake force with which a brake pad of the brake apparatus engages a brake disc of the vehicle, instructing the brake actuator to restore the brake force to the requested brake force when the brake action status indicates that a brake action request is present and the slope status indicates that the vehicle is located on a sloped surface.

In an embodiment, the method according to the invention further comprises the following steps:

obtaining an object approaching status, the object approaching status indicating whether an object is approaching the vehicle;

after instructing a brake actuator of the brake apparatus to reduce a brake force with which a brake pad of the brake apparatus engages a brake disc of the vehicle, instructing the brake apparatus to engage the brake actuator with the requested brake force when the brake action status indicates that a brake action request is present and the object approaching status indicates that an object is approaching the vehicle.

Optionally, this embodiment of the method further comprises the step of: determining whether the vehicle is located within an predicted trajectory of the object that is determined as approaching the vehicle, and to instruct the brake actuator to restore the brake force to the requested brake force only when the control unit has determined that the vehicle is located in a position within or adjacent to the predicted trajectory.

The invention further pertains to a computer program comprising instructions which, when the program is executed by a computer, cause the computer to carry out the method according to the invention.

The invention will be described in more detail below under reference to the drawing, in which in a non-limiting manner exemplary embodiments of the invention will be shown. The drawing shows in:

Figure 5A:
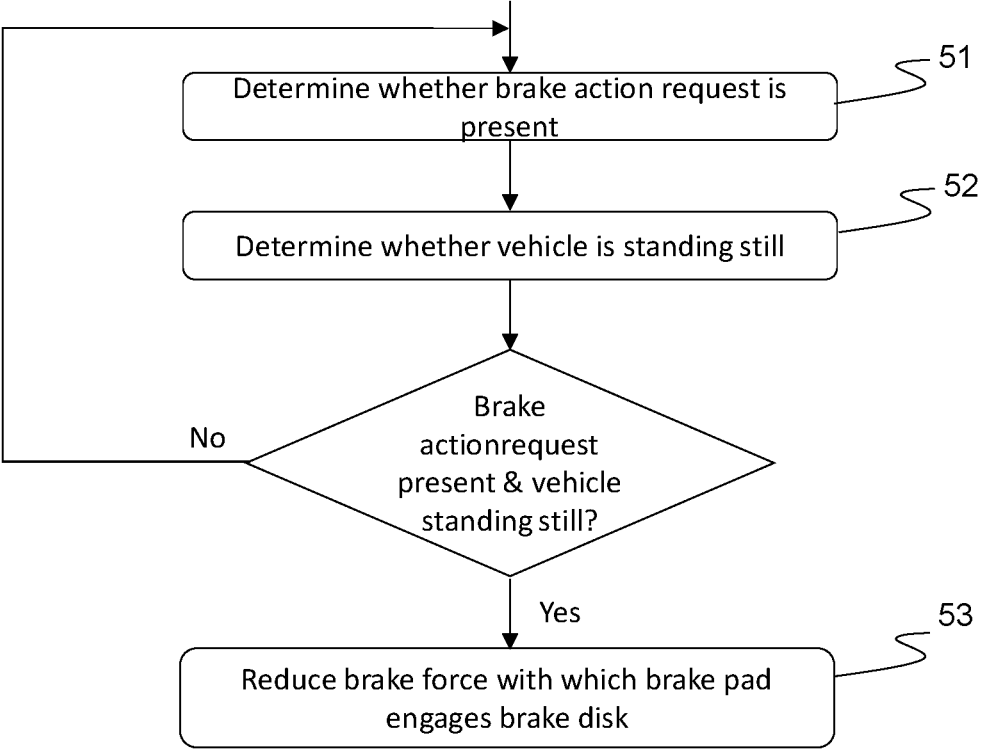
Figure 5B:
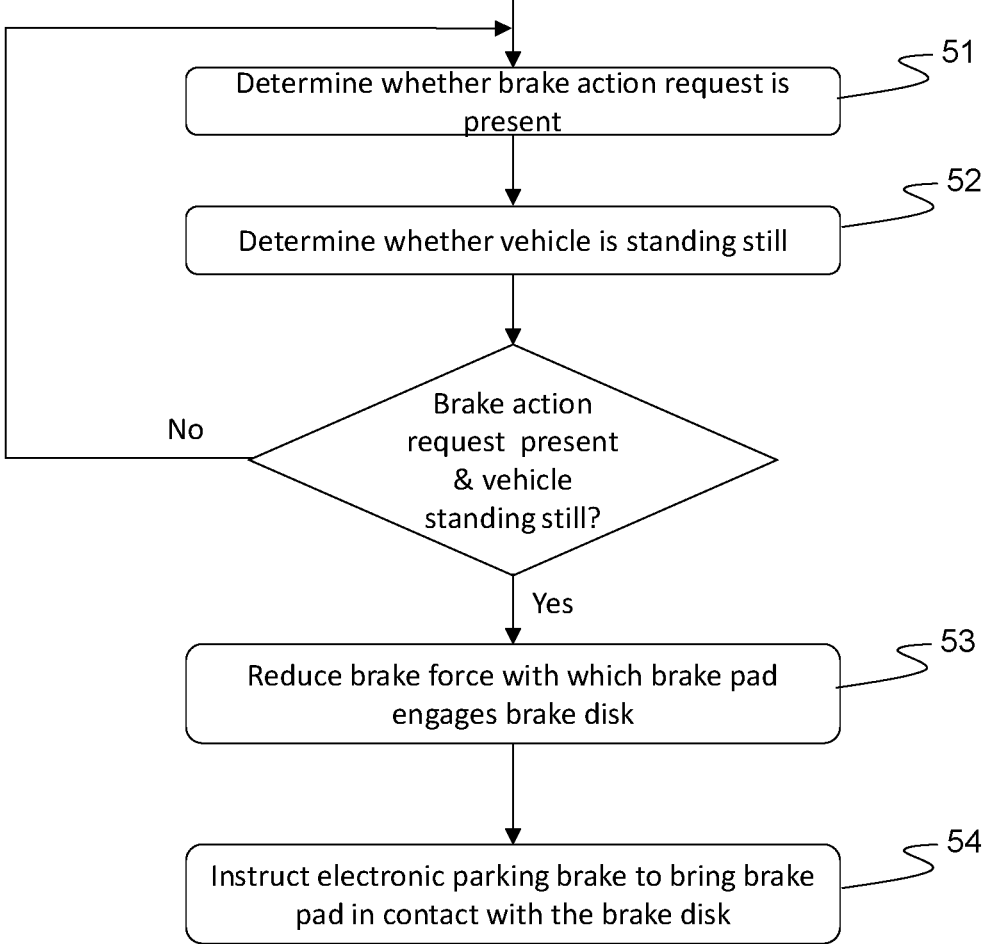
Figure 5C:
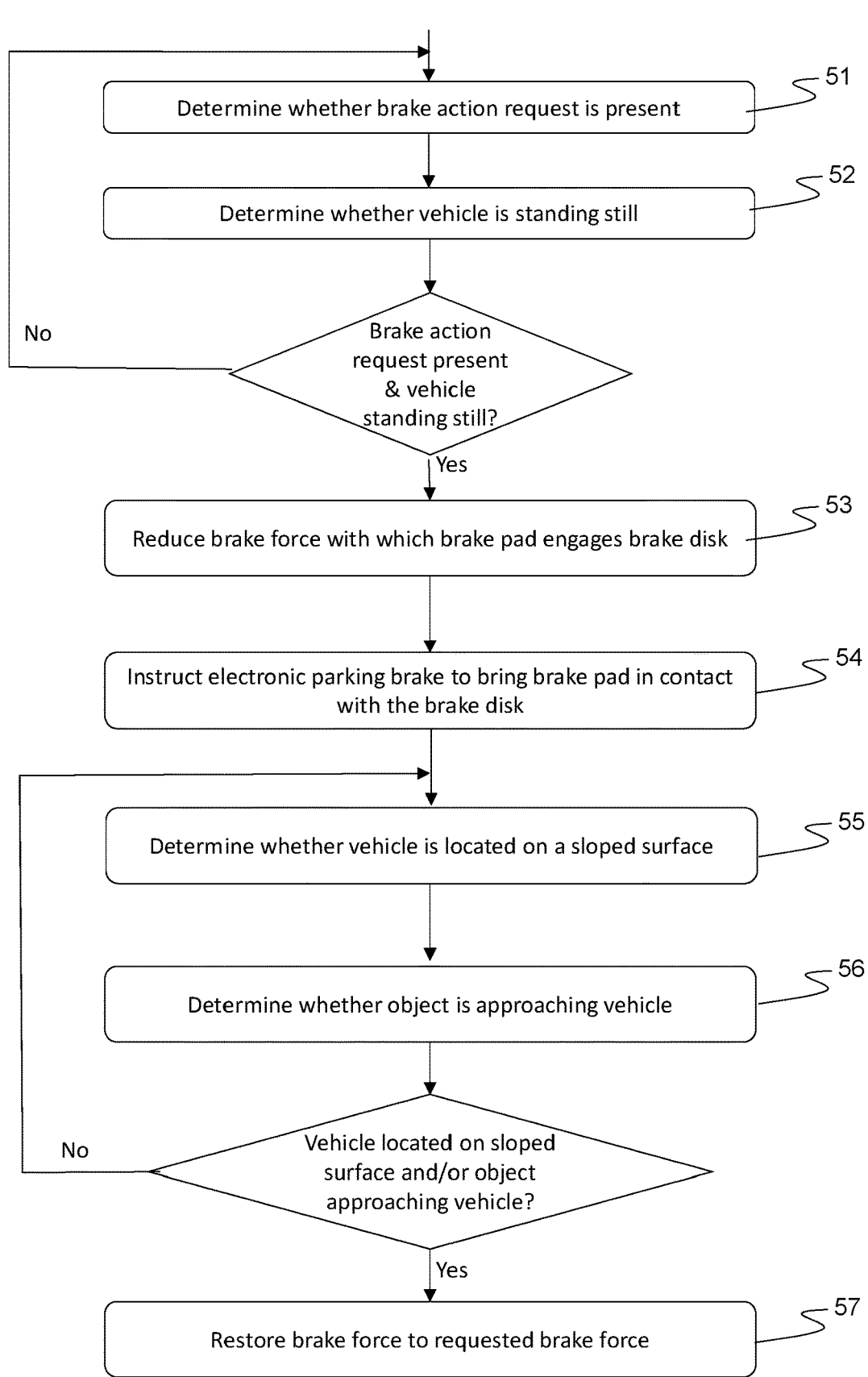
Figure 6:
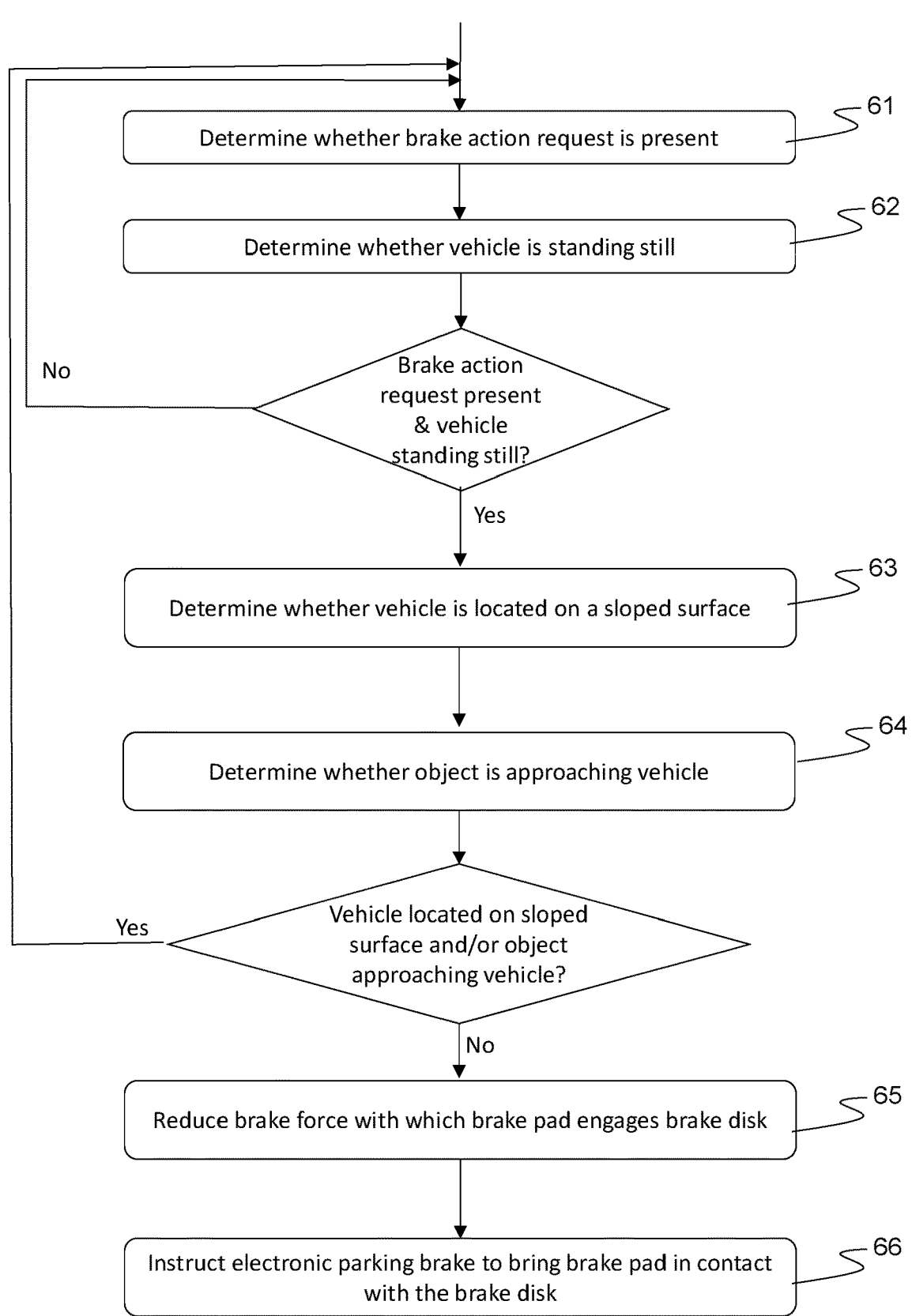

FIG. 5a schematically illustrates a first embodiment of a flow diagram of the method according to the invention;

FIG. 5b schematically illustrates the flow diagram of the embodiment of FIG. 5a, with an additional step of the method according to the invention;

FIG. 5c schematically illustrates the flow diagram of the embodiment of FIG. 5b, with additional steps of the method according to the invention;

FIG. 6 schematically illustrates a second embodiment of a flow diagram of the method according to the invention.

Figure 1:
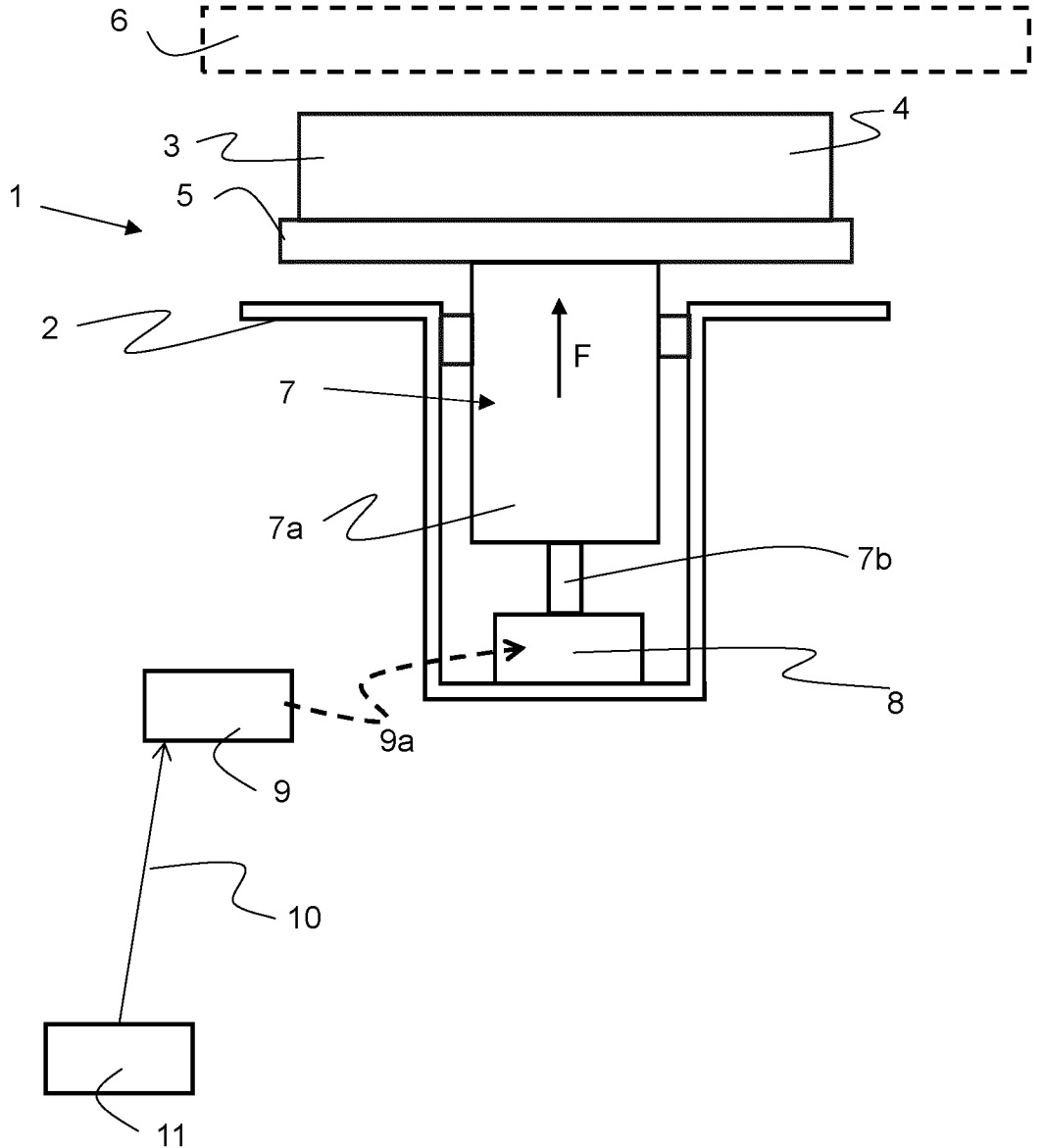
FIG. 1 shows a first embodiment of a brake apparatus according to the invention, with a brake pad engaging a brake disc to generate a brake force.
Figure 2:
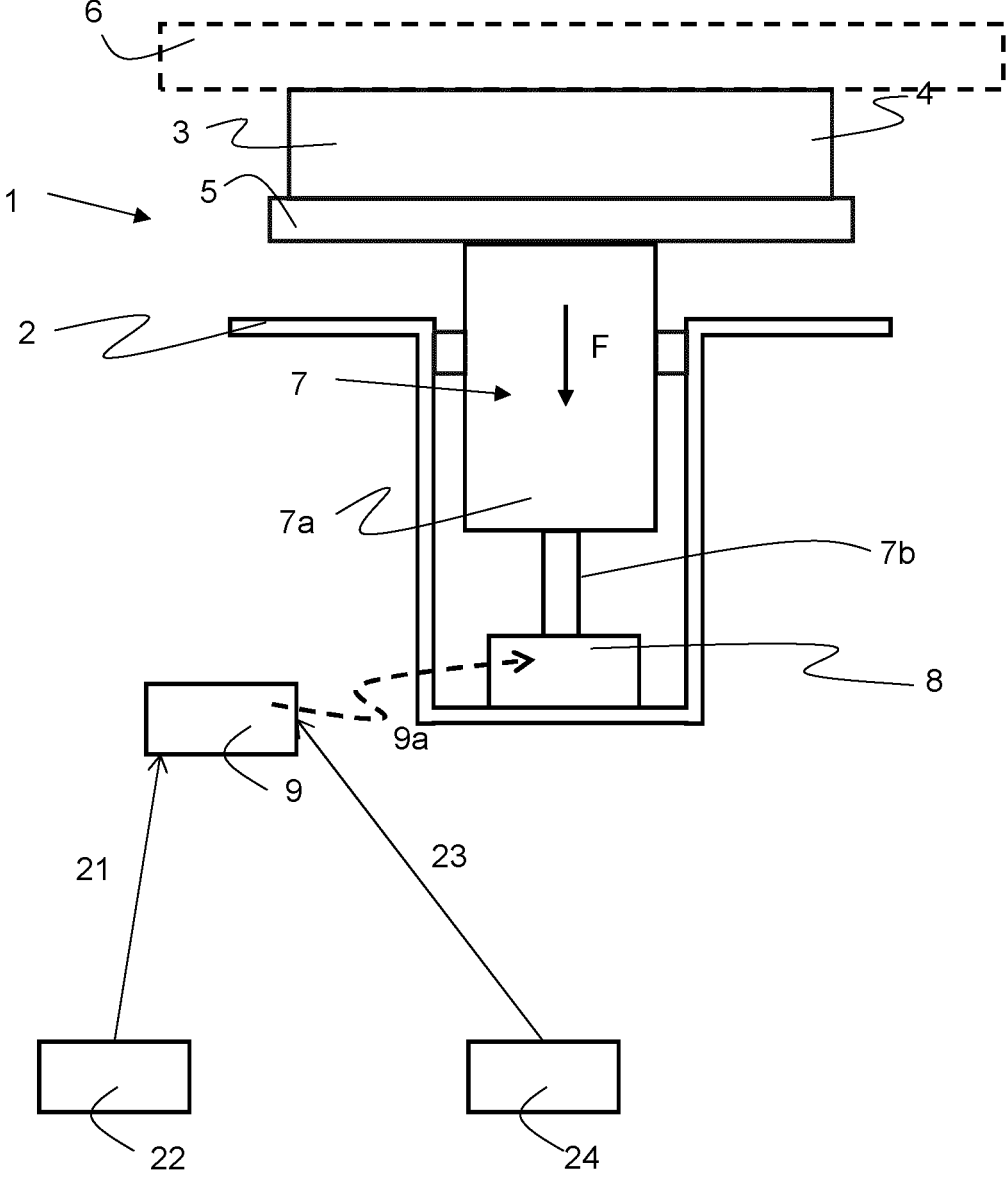
FIG. 2 shows the brake apparatus in the embodiment of FIG. 1, with the brake pad engaging the brake disc having a reduced brake force.

FIG. 1 and FIG. 2 show a first embodiment of a brake apparatus 1 according to the invention. The brake apparatus 1 can be used for a wheel of a vehicle. In FIG. 1, the brake pad engages a brake disc to generate a brake force. FIG. 2 again shows the embodiment of FIG. 1, but now with the brake pad engaging the brake disc having a reduced brake force.

In the embodiment of FIG. 1 and FIG. 2, the brake apparatus 1 comprises a housing 2. The housing 2 is for example a brake caliper or a part thereof.

The brake apparatus 1 comprises a brake pad 3. In this embodiment, the brake pad 3 comprises a brake pad body 4 which is arranged on a brake pad holder 5. In FIG. 1, the brake pad 3 interacts with a brake disc 6 to generate a brake force when the brake pad 3 engages the brake disc 6. The brake disc 6 being associated with the wheel of the vehicle and rotates along with this wheel. The brake disc 6 can for example be a dedicated brake disc which has the main purpose of braking or a rotor of an in-wheel motor.

The brake apparatus 1 further comprises a brake actuator 7, which is adapted to move the brake pad 3 towards the brake disc 6 and to bring the brake pad 3 into contact with the brake disc 6. Therewith a requested brake force is generated. In FIG. 1, arrow F indicates the direction of the brake force. The brake force generates friction between the brake pad 3 and the brake disc 6, which friction slows down the wheel of the vehicle with which the brake disc 6 is associated with. Usually, the brake disc 6 is connected to the wheel to which said brake disc 6 is associated with.

The requested brake force is generated in response to a brake action request. A brake action request can for example be triggered by a driver engaging a brake pedal or by an automated vehicle system, e.g. an automated vehicle safety system or an autonomous driving system, which triggers a brake action request for example in order to avoid a collision.

In the shown embodiment of FIG. 1 and FIG. 2, the brake actuator 7 comprises a piston 7a which is connected indirectly to the brake pad 3 for moving the brake pad 3 towards the brake disc 6 and pressing the brake pad 3 against the brake disc 6 at the requested brake force.

In the embodiment of FIG. 1 and FIG. 2, the brake actuator 7 is a hydraulic actuator. The hydraulic actuator comprises a piston 7a and a hydraulic control unit 8. A seal 7b is provided to prevent leakage of hydraulic fluid. The hydraulic control unit 8 provides a hydraulic pressure to the piston 7a when a brake action request is present. When a brake action request is present the seal 7b deforms as shown in FIG. 2. When the brake action request is removed, the hydraulic pressure on the piston 7a is released. The seal 7b returns to shape as shown in FIG. 1, therewith withdrawing the piston 7a and disengaging the brake pad 3 from the brake disc 6.

Alternatively, the piston 7a of the brake actuator 7 is operated electrically. In that case, the brake actuator 7 for example comprises an electric or electronic motor in combination with a spindle to drive the piston 7a.

The brake actuator 7 is for example mechanically connected or mechanically connectable to a brake pedal (not shown in FIG. 1 and FIG. 2). Alternatively, a brake-by-wire system is present which transmits an input on the brake pedal to the brake actuator 7. Optionally, the brake pedal is part of the brake apparatus 1.

The brake actuator 7 is activated by a control signal 9a, e.g. an electric or electronic control signal, transmitted by a control unit 9. The control signal 9a from the control unit 9 is for example triggered when a brake pedal is pushed down by a driver or by an automated vehicle system such as an autonomous driving system or an automated vehicle safety system such as a collision prevention system.

The control unit 9 is configured to:

determine whether a brake action request is present;

determine whether the vehicle is standing still;

instruct the brake actuator 7 via the control signal 9a to reduce the brake force with which the brake pad 3 engages the brake disc 6 when the control unit 9 has determined that the brake action request is present and the control unit 9 has determined that the vehicle is standing still.

The vehicle is standing still if it does not move over a ground surface in a travelling direction as a result of rotation of a wheel of the vehicle and/or sliding of a wheel of the vehicle over the ground surface.

The brake actuator 7 is not only adapted to move the brake pad 3 towards the brake disc 6 and to press the brake pad against the brake disc, but also to move the brake pad 3 away from the brake disc 6 when the brake is released, i.e. the brake action request is removed. The brake action request is for example removed when a driver releases the brake pedal or when the automated vehicle system that triggered the brake action request no longer maintains the brake action request.

The control unit 9 is adapted to receive a brake action signal 10 (see FIG. 1a) which indicates that a brake action request is present. This brake action signal 10 is provided by a sensor 11. The sensor 11 may for example be a force sensor, a pressure sensor, a position sensor, a displacement sensor and/or an automated vehicle system. Optionally, the force sensor determines the force that is exerted on the brake pedal. Optionally, the pressure sensor determines the pressure that is exerted on the brake pedal. Optionally, the position sensor determines the position of the brake pedal. Optionally, the displacement sensor determines the displacement of the brake pedal. The force sensor, pressure sensor, position sensor and/or displacement sensor is for example a sensor which is used also by at least one other system in the vehicle. Alternatively, the velocity sensor is a dedicated sensor that forms part of the brake apparatus.

Optionally, the control unit 9 comprises a brake action signal input port which is adapted to receive the brake action signal 10.

In the embodiment of FIG. 1 and FIG. 2, the control unit 9 is adapted to receive a vehicle velocity signal 21 which is indicative of the velocity of the vehicle. The control unit 9 is adapted to derive from the vehicle velocity signal 21 whether the vehicle is standing still or not. This vehicle velocity signal 21 and/or input for the vehicle velocity signal can for example be provided by a velocity sensor 22 which determines the overall velocity of the vehicle or a rotational velocity sensor which determines the rotational velocity and/or angular velocity of a wheel of the vehicle. Alternatively or in addition, the vehicle velocity signal 21 and/or input for the vehicle velocity signal can be provided by an automated vehicle system. Optionally, the velocity sensor is for example a sensor which is used also by at least one other system in the vehicle. Alternatively, the velocity sensor is for example a dedicated sensor that forms part of the brake apparatus 1.

Optionally, the control unit 9 comprises a vehicle velocity signal input port which is adapted to receive the vehicle velocity signal.

When a brake action request is still present while the control unit 9 determines that the vehicle has already come to a standstill, e.g. when the driver keeps on pressing the brake pedal while the vehicle is standing still in front of a red traffic light, the control unit 9 instructs the brake actuator 7 to reduce the brake force with which the brake pad 3 engages the brake disc 6. So, the brake force is reduced when the full brake force is no longer necessary because the vehicle is already standing still. The reduction of the brake force is indicated in FIG. 2 by arrow F which is directed in the other direction compared to the situation visualized in FIG. 1.

By doing so, the brake force that has to be overcome to move away the brake pad 3 from the brake disc 6 when the brake action request is removed is also reduced. This makes it easier to move away the brake pad 3 from the brake disc 6 once the vehicle is to be put in motion again, and therewith reduces the risk that brake drag occurs.

In the embodiment of FIG. 1 and FIG. 2, the brake apparatus 1 further comprises an inclination sensor 24 which is configured to measure the inclination of the vehicle with respect to horizontal. The control unit 9 is adapted to receive an inclination signal 23 from the inclination sensor 24 which is indicative of the inclination of the vehicle. Therewith the control unit 9 is configured to determine whether the vehicle is located on a sloped surface based on a measurement of the inclination sensor 24. The control unit 9 is further configured to:

after instructing the brake actuator 9 to reduce the brake force with which the brake pad 3 engages the brake disc 6, instruct the brake actuator 9 to restore the brake force to the requested brake force when the control unit 9 has determined that the vehicle is located on a sloped surface.

This adds a safety feature to the brake apparatus 1: in case the vehicle is on a sloped surface, there is a risk that the vehicle may start moving unintentionally when the brake force has been reduced.

Optionally, the control unit 9 is configured to determine that the vehicle is located on a sloped surface if the measurement of the inclination sensor 24 is not substantially equal to 0°, and is configured to determine that the vehicle is not located on a sloped surface if the measurement of the inclination sensor 24 is substantially equal to 0°.

Alternatively, the control unit 9 of the brake apparatus 1 is further configured to:

determine whether the vehicle is located on a sloped surface; and prevent instruction of the brake actuator 9 to reduce the brake force with which the brake pad 3 engages the brake disc 9.

Figure 3:
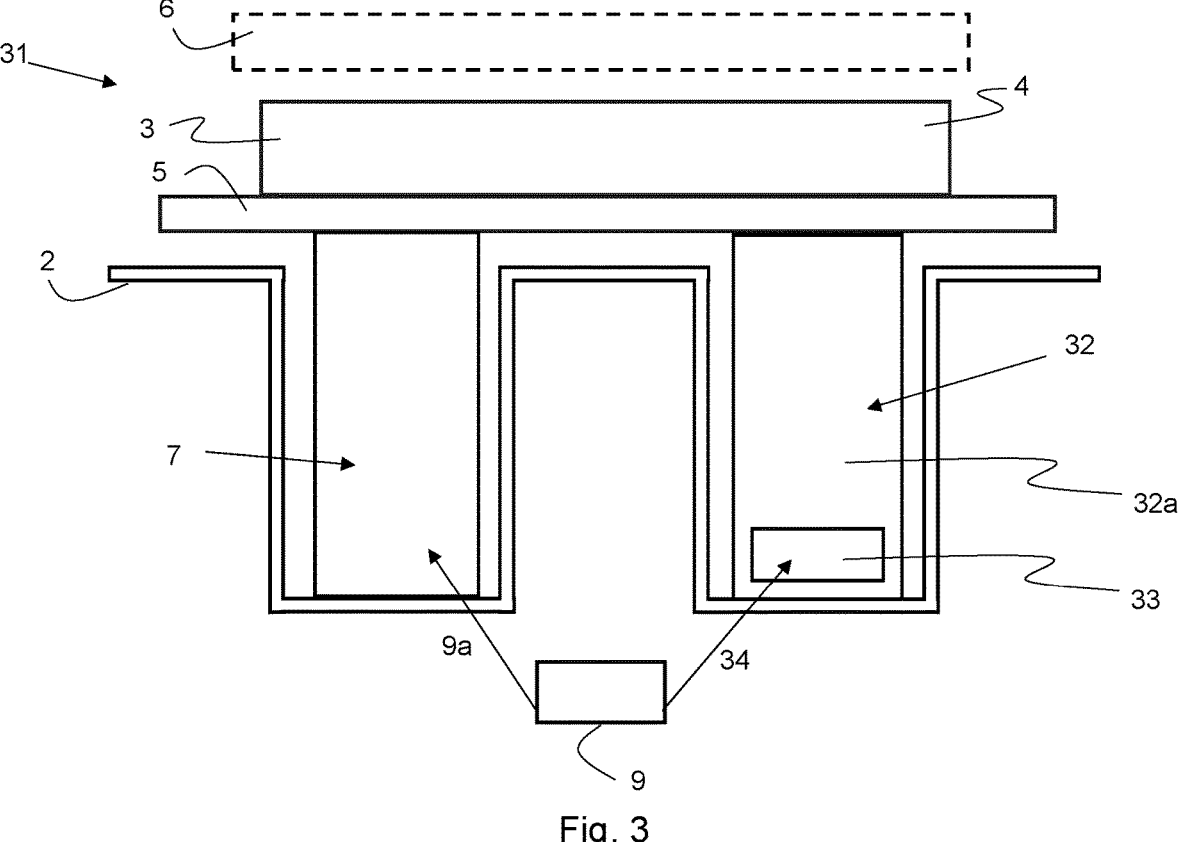
FIG. 3 shows a second embodiment of a brake apparatus according to the invention comprising an electronic parking brake.

FIG. 3 shows a second embodiment of a brake apparatus 31 according to the invention. The brake apparatus 31 can be used for a wheel of a vehicle. In FIG. 3, the brake pad engages a brake disc to generate a brake force. FIG. 3 shows that the brake pad engaging the brake disc having a reduced brake force.

In the embodiment of FIG. 3, the brake apparatus 31 comprises a housing 2. The housing 2 is for example a brake caliper or a part thereof.

The brake apparatus 31 comprises a brake pad 3. In this embodiment, the brake pad 3 comprises a brake pad body 4 which is arranged on a brake pad holder 5. In FIG. 3, the brake pad 3 interacts with a brake disc 6 to generate a brake force when the brake pad 3 engages the brake disc 6. The brake disc 6 being associated with the wheel of the vehicle and rotates along with this wheel. The brake disc 6 can for example be a dedicated brake disc which has the main purpose of braking or a rotor of an in-wheel motor.

In the embodiment of FIG. 3, the brake apparatus 1 further comprises a brake actuator 7, which is adapted to move the brake pad 3 towards the brake disc 6 and to bring the brake pad 3 into contact with the brake disc 6. Therewith a requested brake force is generated. The brake force generates friction between the brake pad 3 and the brake disc 6, which friction slows down the wheel of the vehicle with which the brake disc 6 is associated with. Usually, the brake disc 6 is connected to the wheel to which said brake disc 6 is associated with.

In the embodiment of FIG. 3, the brake actuator 7 is a hydraulic actuator. The hydraulic actuator comprises a piston 7a and a hydraulic control unit 8. A seal 7b is provided to prevent leakage of hydraulic fluid. The hydraulic control unit 8 provides a hydraulic pressure to the piston 7a when a brake action request is present. When a brake action request is present the seal 7b deforms as shown in FIG. 2. When the brake action request is removed, the hydraulic pressure on the piston 7a is released. The seal 7b returns to shape as shown in FIG. 1, therewith withdrawing the piston 7a and disengaging the brake pad 3 from the brake disc 6.

The brake actuator 7 is activated by a control signal 9a, e.g. an electric or electronic control signal, transmitted by a control unit 9. The control signal 9a from the control unit 9 is for example triggered when a brake pedal is pushed down by a driver or by an automated vehicle system such as an autonomous driving system or an automated vehicle safety system such as a collision prevention system.

The control unit 9 is configured to:

determine whether a brake action request is present;

determine whether the vehicle is standing still;

instruct the brake actuator 7 via the control signal 9*a* to reduce the brake force with which the brake pad 3 engages the brake disc 6 when the control unit 9 has determined that the brake action request is present and the control unit 9 has determined that the vehicle is standing still.

The vehicle is standing still if it does not move over a ground surface in a travelling direction as a result of rotation of a wheel of the vehicle and/or sliding of a wheel of the vehicle over the ground surface.

The brake actuator 7 is not only adapted to move the brake pad 3 towards the brake disc 6 and to press the brake pad 3 against the brake disc 6, but also to move the brake pad 3 away from the brake disc 6 when the brake is released, i.e. the brake action request is removed. The brake action request is for example removed when a driver releases the brake pedal or when the automated vehicle system that triggered the brake action request no longer maintains the brake action request.

The brake actuator 7 may alternatively for example be actuated electrically or pneumatically.

In the embodiment of FIG. 3, the brake apparatus 31 further comprises an electronic parking brake 32. The electronic parking brake 32 is configured to bring the brake pad 3 in contact with the brake disc 6 if the vehicle is standing still, therewith generating a brake force to keep the vehicle standing still. In this embodiment, the control unit 9 is further configured to, after instructing the brake actuator 7 to reduce the brake force with which the brake pad 3 engages the brake disc 6, instruct the electronic parking brake 32 to bring the brake pad 3 in contact with the brake disc 6.

The brake pad 3 which can be brought into contact with the brake disc 6 can be a brake pad 3 of the brake apparatus 31 or a dedicated parking brake pad.

The electronic parking brake 32 comprises a parking brake actuator 32*a*, which, in the embodiment of FIG. 3, is separate from the brake actuator 7 of the brake apparatus 31. The parking brake actuator 32*a* is preferably an electric or electronic actuator, comprising for example an electric or electronic motor in combination with a spindle and/or piston, or a linear actuator. Contrary to a brake actuator that cooperates with a brake pedal, the parking brake actuator 32*a* does not have to be designed for the right "pedal feel", i.e. the feedback that the brake pedal gives to the driver. This makes that the design of the parking brake actuator 32*a* can be optimised to minimise or even eliminate the risk of brake drag after disengagement of the parking brake. For example, when the electronic parking brake 32 is disengaged, the brake pad 3 can be retracted more rigorously than if the brake apparatus 31 itself would do that. Therefore, the risk of brake drag is reduced in this embodiment even though a brake force is present when the vehicle is standing still. The use of the electronic parking brake 32 allows to retract the brake pad 3 in such a way that the risk of brake drag is minimised or even eliminated.

Further, the electronic parking brake 32 comprises a parking brake controller 33, which is adapted to receive a parking brake activation signal 34 from the control unit 9 of the brake apparatus 31 to activate the electronic parking brake 32 to bring the brake pad 3 in contact with the brake disc 6.

Figure 4A:
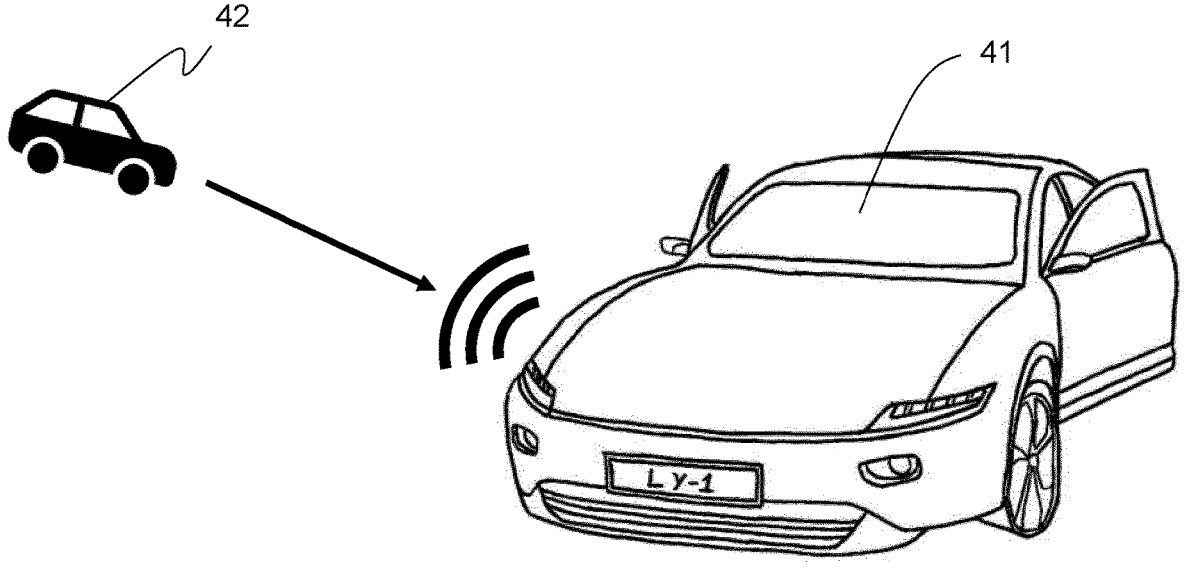
FIG. 4a shows a third embodiment of a brake apparatus according to the invention wherein the brake apparatus detects whether an object is approaching the vehicle.

FIG. 4*a* shows a third embodiment of a brake apparatus according to the invention wherein the brake apparatus detects whether an object is approaching the vehicle. In FIG. 4*a*, the vehicle 41, which is standing still, is a passenger car comprising four wheels (only the left front wheel is visible in FIG. 4*a*) and a brake apparatus for example according to FIG. 1, FIG. 2 and/or FIG. 3. The brake apparatus comprises the same number of brake pads and the same number of brake actuators as the number of wheels of the vehicle 41.

The control unit of the brake apparatus is configured to:
  determine whether an object 42 is approaching the vehicle 41;
  after instructing the brake actuator to reduce the brake force with which the brake pad engages the brake disc, instruct the brake actuator to restore the brake force to the requested brake force when the control unit has determined (i.e. detected) that the object 42 is approaching the vehicle 41. The object 42 in FIG. 4*a* is another vehicle that is moving towards the vehicle 41 with the brake apparatus.

This adds a safety feature to the brake apparatus. When the vehicle 41 is approached by the approaching vehicle 42 it can move the vehicle 41 out of the position in which it is standing still. The control unit of the brake apparatus instructs the brake actuator to restore the brake force to the requested brake force. This way, undesired movement of the vehicle 41 is prevented.

Optionally, the control unit is configured to determine whether vehicle 41 is located within a predicted trajectory of the approaching vehicle 42 that is determined as approaching the vehicle, and to instruct the brake actuator to restore the brake force to the requested brake force only when the control unit has determined that the vehicle is located in a position within or adjacent to the predicted trajectory.

Optionally, the brake apparatus further comprises a camera which is configured to capture a stream of pictures of an area around the vehicle. In addition, the control unit is further configured to:
  analyse the stream of pictures of the area around the vehicle to obtain a picture stream analysis result,
  determine whether an object is approaching the vehicle based on the picture stream analysis result.

Optionally, the control unit is configured to determine a predicted trajectory of the object based on the picture stream analysis result.

Optionally, as an alternative for or in addition to the camera, the brake apparatus further comprises a radar and/or a lidar, configured to detect a position and/or a velocity and/or an acceleration of objects in an area around the vehicle. The control unit is further configured to determine whether an object is approaching the vehicle based on the position and/or the velocity and/or the acceleration of objects in the area around the vehicle. Optionally, the control unit is configured to determine a predicted trajectory of a detected object based on input that is received by the control unit from the radar and/or lidar.

Optionally, the brake apparatus further comprises an electronic parking brake. The electronic parking brake is configured to bring a brake pad in contact with the brake disc if the vehicle is standing still, therewith generating a brake force to keep the vehicle standing still. In this variant, the control unit is further configured to, after instructing the brake actuator to reduce the brake force with which the brake pad engages the brake disc, and after it has been determined by the control unit that an object approached the vehicle, instruct the electronic parking brake to bring the brake pad in contact with the brake disc.

In a variant of this embodiment, the control unit of the brake apparatus is alternatively configured to:
  determine whether the object is approaching the vehicle; and prevent instruction of the brake actuator to reduce the brake force with which the brake pad engages the brake disc.

Figure 4B:
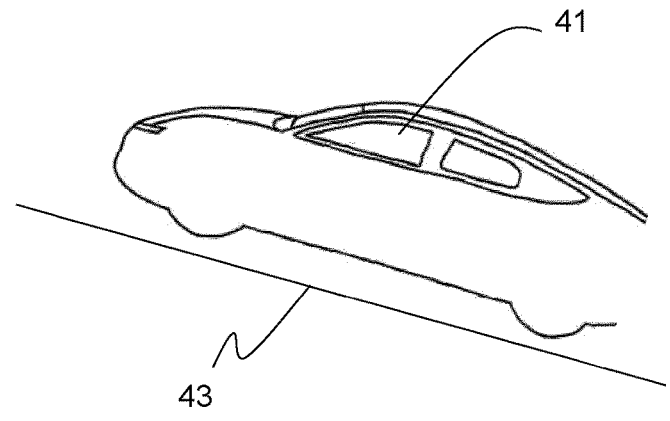
FIG. 4b shows a fourth embodiment of a brake apparatus according to the invention, with the vehicle located on a sloped surface.

FIG. 4b shows a fourth embodiment of a brake apparatus according to the invention, with the vehicle located on a sloped surface. In FIG. 4b, the vehicle 41, which is standing still on a sloped surface 43, is a passenger car comprising four wheels (only the left front wheel and left rear wheel are visible in FIG. 4b) and a brake apparatus for example according to FIG. 1, FIG. 2 and/or FIG. 3. The brake apparatus comprises the same number of brake pads and the same number of brake actuators as the number of wheels of the vehicle 41.

The control unit of the brake apparatus is configured to:

determine whether the vehicle 41 is located on a sloped surface 43; and after instructing the brake actuator to reduce the brake force with which the brake pad engages the brake disc, instruct the brake actuator to restore the brake force to the requested brake force when the control unit has determined that the vehicle 41 is located on the sloped surface 43.

This embodiment adds a safety feature to the brake apparatus. Because the vehicle 41 is on the sloped surface 43, there is a risk that the vehicle 41 may start moving unintentionally when the brake force has been reduced.

Optionally, in this embodiment, the brake apparatus further comprises the inclination sensor (see also FIG. 2) configured to measure the inclination of the vehicle 41 with respect to horizontal, wherein the control unit is configured to determine whether the vehicle is located on a sloped surface 43 based on a measurement of the inclination sensor. Optionally, the control unit is configured to determine that the vehicle 41 is located on a sloped surface 43 if the measurement of the inclination sensor is not substantially equal to 0°, and is configured to determine that the vehicle is not located on a sloped surface if the measurement of the inclination sensor is substantially equal to 0°.

In a variant of this embodiment, the control unit of the brake apparatus is further configured to:

determine whether the vehicle is located on a sloped surface; and prevent instruction of the brake actuator to reduce the brake force with which the brake pad engages the brake disc.

Alternatively, in a further variant of this embodiment, the brake apparatus further comprises an electronic parking brake. The electronic parking brake is configured to bring a brake pad in contact with the brake disc if the vehicle is standing still, therewith generating a brake force to keep the vehicle standing still. In this variant, the control unit is further configured to, after instructing the brake actuator to reduce the brake force with which the brake pad engages the brake disc, and after it has been determined by the control unit that the vehicle is arranged on a sloped surface, instruct the electronic parking brake to bring the brake pad in contact with the brake disc.

The brake pad which can be brought into contact with the brake disc can be a brake pad of the brake apparatus or a dedicated parking brake pad.

Optionally, in the embodiment of FIG. 4b or in a variant thereof, the electronic parking brake comprises a parking brake actuator, which is separate from the brake actuator of the brake apparatus. The parking brake actuator is preferably an electric or electronic actuator, comprising for example an electric or electronic motor in combination with a spindle and/or piston, or a linear actuator. Contrary to a brake actuator that cooperates with a brake pedal, the parking brake actuator does not have to be designed for the right "pedal feel", i.e. the feedback that the brake pedal gives to the driver. This makes that the design of the parking brake actuator can be optimised to minimise or even eliminate the risk of brake drag after disengagement of the parking brake. For example, when the electronic parking brake is disengaged, the brake pad can be retracted more rigorously than if the brake apparatus itself would do. Therefore, the risk of brake drag is reduced in this embodiment even though a brake force is present when the vehicle is standing still. The use of the electronic parking brake allows to retract the brake pad in such a way that the risk of brake drag is minimised or eliminated.

Optionally, in the embodiment of FIG. 4b or in a variant thereof, the electronic parking brake comprises a parking brake controller, which is adapted to receive a parking brake activation signal from the control unit of the brake apparatus to activate the electronic parking brake configured to bring the brake pad in contact with the brake disc.

FIG. 5a schematically illustrates a first embodiment of a flow diagram of the method according to the invention for adjusting the brake force exerted by a brake apparatus of a vehicle.

The method according to the invention comprising a first step 51 of obtaining a brake action status indicating whether a brake action request is present.

The next step 52 of the method according to the invention is obtaining a standstill status indicating whether the vehicle is standing still.

In a further step 53 of the method according to the invention, when the brake action status indicates that a brake action request is present (step 51) and the standstill status indicates that the vehicle is standing still (step 52), a brake actuator of the brake apparatus is instructed to reduce a brake force with which a brake pad of the brake apparatus engages a brake disc of the vehicle.

When no brake action request is present (step 51) and/or the vehicle is not standing still (step 52), the steps 51 and 52 of the flow diagram of FIG. 5a are executed again to create a closed loop.

FIG. 5b schematically illustrates the first embodiment of a flow diagram of the method according to the invention of FIG. 5a with an additional step for adjusting the brake force exerted by a brake apparatus of a vehicle.

The method according to the invention further comprises the additional step 54 of, after instructing a brake actuator of the brake apparatus to reduce a brake force with which a brake pad of the brake apparatus engages a brake disc of the vehicle, instructing an electronic parking brake to bring the brake pad in contact with the brake disc. Therewith a brake force is generated to keep the vehicle standing still.

FIG. 5c schematically illustrates the embodiment of a flow diagram of the method according to the invention of FIG. 5b with additional steps for adjusting the brake force exerted by a brake apparatus of a vehicle.

The method according to the invention further comprises the step 55 of obtaining a slope status indicating whether the vehicle is located on a sloped surface.

The next step 56 of the method according to the invention is obtaining an object approaching status, the object approaching status indicating whether an object is approaching the vehicle.

In a further step 57 of the method according to the invention, after instructing a brake actuator of the brake apparatus to reduce a brake force with which a brake pad of the brake apparatus engages a brake disc of the vehicle, the brake actuator is instructed to restore the brake force to the requested brake force when the brake action status indicates that a brake action request is present and when the slope status indicates that the vehicle is located on a sloped surface and/or the object approaching status indicates that an object is approaching the vehicle.

Alternatively to this step 57, the method comprises the step of preventing instruction of the brake actuator of the brake apparatus to reduce the brake force with which the brake pad engages the brake disc when the brake action status indicates that a brake action request is present and when the slope status indicates that the vehicle is located on a sloped surface and/or the object approaching status indicates that an object is approaching the vehicle.

When it is determined that the vehicle is not located on a sloped surface (step 55) and that no object is approaching the vehicle (step 56), the steps 55 and 56 of the flow diagram of FIG. 5*c* are executed again to create a closed loop.

Optionally, this embodiment of the method further comprises the step of determining whether the vehicle is located within an predicted trajectory of the object that is determined as approaching the vehicle, and to instruct the brake actuator to restore the brake force to the requested brake force only when it is determined that the vehicle is located in a position within or adjacent to the predicted trajectory.

FIG. 6 schematically illustrates a second embodiment of a flow diagram of the method according to the invention for adjusting the brake force exerted by a brake apparatus of a vehicle.

The second embodiment comprises a first step 61 of obtaining a brake action status indicating whether a brake action request is present.

The next step 62 is obtaining a standstill status indicating whether the vehicle is standing still.

When no brake action request is present (step 61) and/or the vehicle is not standing still (step 62), the steps 61 and 62 of the flow diagram of FIG. 6 are executed again to create a closed loop.

The method further comprises the step 63 of determining whether the vehicle is located on a sloped surface and/or the step 64 of determining whether an object is approaching the vehicle.

When it is determined that the vehicle is not located on a sloped surface (step 63) and that no object is approaching the vehicle (step 64), a brake actuator of the brake apparatus is instructed to reduce a brake force with which a brake pad of the brake apparatus engages a brake disc of the vehicle (step 65).

When it is determined that the vehicle is located on a sloped surface (step 63) and/or that an object is approaching the vehicle (step 64), the flow diagram of FIG. 6 is executed again from the beginning to create a closed loop.

The embodiment of FIG. 6 further comprises the additional step 66 of, after instructing a brake actuator of the brake apparatus to reduce a brake force with which a brake pad of the brake apparatus engages a brake disc of the vehicle, instructing an electronic parking brake to bring the brake pad in contact with the brake disc. Therewith a brake force is generated to keep the vehicle standing still.

The invention claimed is:

1. A brake apparatus for a wheel of a vehicle, comprising:
   a brake pad arranged to interact with a brake disc to generate a brake force when the brake pad engages the brake disc, the brake disc being associated with the wheel of the vehicle;
   a brake actuator, which is adapted to move the brake pad towards the brake disc, and bring the brake pad into contact with the brake disc, therewith generating a requested brake force in response to a brake action request;
   an electronic parking brake, configured to bring a brake pad in contact with the brake disc if the vehicle is standing still, therewith generating a brake force to keep the vehicle standing still;
   a control unit configured to:
      determine whether a brake action request is present;
      determine whether the vehicle is standing still;
      instruct the brake actuator to reduce the brake force with which the brake pad engages the brake disc when the control unit has determined that the brake action request is present and the control unit has determined that the vehicle is standing still;
      after instructing the brake actuator to reduce the brake force with which the brake pad engages the brake disc, instruct the electronic parking brake to bring the brake pad in contact with the brake disc.

2. The brake apparatus according to claim 1, wherein the control unit is configured to instruct the brake actuator to eliminate the brake force.

3. The brake apparatus according to claim 1, wherein the brake apparatus further comprises a brake pedal and a brake pedal pressure sensor, and
   wherein the brake pedal is adapted to be used by the driver of the vehicle to generate a brake action request, and
   wherein the brake pedal pressure sensor is adapted to measure pedal pressure that is exerted on the brake pedal by a driver, and
   wherein the brake actuator is adapted to generate a requested brake force that has a predetermined relation with the measured pedal pressure, wherein the requested brake force is proportional to the measured pedal pressure.

4. The brake apparatus according to claim 1, further comprising a velocity sensor configured to measure the velocity of the vehicle, wherein the control unit is configured to determine whether the vehicle is standing still based on a measurement of the velocity sensor.

5. The brake apparatus according to claim 4, wherein the control unit is configured to determine that the vehicle is standing still if the result of the measurement of the velocity sensor is substantially equal to 0 m/s, and is configured to determine that the vehicle is not standing still if the result of the measurement of the velocity sensor is not substantially equal to 0 m/s.

6. The brake apparatus according to claim 1, wherein the control unit is configured to monitor the velocity of the vehicle after the control unit has instructed the brake actuator to reduce the brake force with which the brake pad engages the brake disc and to instruct the brake actuator to restore the brake force to the requested brake force when the control unit has determined that the vehicle is not standing still.

7. The brake apparatus according claim 1, wherein the control unit is further configured to:
   determine whether the vehicle is located on a sloped surface;
   after instructing the brake actuator to reduce the brake force with which the brake pad engages the brake disc, instruct the brake actuator to restore the brake force to the requested brake force when the control unit has determined that the vehicle is located on a sloped surface, or
   prevent instruction of the brake actuator to reduce the brake force with which the brake pad engages the brake disc when the control unit has determined that the vehicle is located on a sloped surface.

8. The brake apparatus according to claim 7, further comprising an inclination sensor configured to measure the inclination of the vehicle with respect to horizontal, wherein the control unit is configured to determine whether the vehicle is located on a sloped surface based on a measurement of the inclination sensor.

9. The brake apparatus according to claim 8, wherein the control unit is configured to determine that the vehicle is located on a sloped surface if the measurement of the inclination sensor is not substantially equal to 0°, and is configured to determine that the vehicle is not located on a sloped surface if the measurement of the inclination sensor is substantially equal to 0°.

10. The brake apparatus according to claim 1, wherein the control unit is further configured to:

determine whether an object is approaching the vehicle;

after instructing the brake actuator to reduce the brake force with which the brake pad engages the brake disc, instruct the brake actuator to restore the brake force to the requested brake force when the control unit has detected that an object is approaching the vehicle, or prevent instruction of the brake actuator to reduce the brake force with which the brake pad engages the brake disc when the control unit has determined that an object is approaching the vehicle.

11. The brake apparatus according to claim 10, further comprising a camera configured to capture a stream of pictures of an area around the vehicle, wherein control unit is further configured to:

analyse the stream of pictures of the area around the vehicle to obtain a picture stream analysis result, determine whether an object is approaching the vehicle based on the picture stream analysis result.

12. The brake apparatus according to claim 10, further comprising a radar and/or a lidar, configured to detect a position and/or a velocity and/or an acceleration of objects in an area around the vehicle, wherein the control unit is further configured to determine whether an object is approaching the vehicle based on the position and/or the velocity and/or the acceleration of objects in the area around the vehicle.

13. The brake apparatus according to claim 1, comprising:

a plurality of brake pads, each brake pad being arranged to interact with an associated brake disc to generate a brake force when the brake pad engages the associated brake disc, each brake disc being associated with a single wheel of the vehicle;

a plurality of brake actuators, each brake actuator being adapted to move a respective brake pad towards its associated brake disc, and bring the respective brake disc into contact with the associated brake disc, therewith generating a requested brake force in response to a brake action request;

wherein the control unit is configured to instruct the brake actuator to reduce the brake force with which at least two brake pads of the plurality of brake pads engage their respective brake disc when the control unit has determined that the brake action request is present and the control unit has determined that the vehicle is standing still.

14. The brake apparatus according to claim 13, wherein the control unit is configured to instruct all but one of the brake actuators to reduce or eliminate the respective brake force.

15. The brake apparatus according to claim 13, wherein the control unit is configured to instruct the plurality of brake actuators to equally reduce the respective brake force.

16. A vehicle comprising:

at least one wheel;

a brake apparatus according to claim 13;

wherein the brake apparatus comprises the same number of brake pads and the same number of brake actuators as the number of wheels of the vehicle.

17. A method for adjusting the brake force exerted by a brake apparatus of a vehicle, the method comprising the following steps:

obtaining a brake action status indicating whether a brake action request is present;

obtaining a standstill status indicating whether the vehicle is standing still;

when the brake action status indicates that a brake action request is present and the standstill status indicates that the vehicle is standing still, instructing a brake actuator of the brake apparatus to reduce a brake force with which a brake pad of the brake apparatus engages a brake disc of the vehicle.

18. The method according to claim 17, further comprising the following step:

after instructing a brake actuator of the brake apparatus to reduce a brake force with which a brake pad of the brake apparatus engages a brake disc of the vehicle, instructing the brake actuator to restore the brake force to the requested brake force when the brake action status indicates that a brake action request is present and the standstill status indicates that the vehicle is not standing still.

19. The method according to claim 17, further comprising the following step:

after instructing the brake actuator to reduce the brake force with which the brake pad engages the brake disc, instructing an electronic parking brake to bring the brake pad in contact with the brake disc if the vehicle is standing still, therewith generating a brake force to keep the vehicle standing still.

20. The method according to claim 17, further comprising the following steps:

obtaining a slope status indicating whether the vehicle is located on a sloped surface;

after instructing a brake actuator of the brake apparatus to reduce a brake force with which a brake pad of the brake apparatus engages a brake disc of the vehicle, instructing the brake actuator to restore the brake force to the requested brake force when the brake action status indicates that a brake action request is present and the slope status indicates that the vehicle is located on a sloped surface, or preventing instruction of the brake actuator to reduce the brake force with which the brake pad engages the brake disc when the brake action status indicates that a brake action request is present and the slope status indicates that the vehicle is located on a sloped surface.

21. The method of claim 17, further comprising the following steps:

obtaining an object approaching status, the object approaching status indicating whether an object is approaching the vehicle;

after instructing a brake actuator of the brake apparatus to reduce a brake force with which a brake pad of the brake apparatus engages a brake disc of the vehicle, instructing the brake apparatus to engage the brake actuator with the requested brake force when the brake action status indicates that a brake action request is present and the object approaching status indicates that an object is approaching the vehicle, or preventing instruction of the brake actuator to reduce the brake force with which the brake pad engages the brake disc when the brake action status indicates that a brake action request is present and the object approaching status indicates that an object is approaching the vehicle.

22. A computer program comprising instructions which, when the program is executed by a computer, cause the computer to carry out the method of claim 17.

\* \* \* \* \*